(12) United States Patent
Charles et al.

(10) Patent No.: US 11,591,247 B2
(45) Date of Patent: Feb. 28, 2023

(54) COMBINED FURNACE

(71) Applicant: ARC FRANCE, Arques (FR)

(72) Inventors: Herve Charles, Arques (FR);
Jean-Marie Bonningues, Arques (FR);
Sebastien Donze, Arques (FR);
Francois Famchon, Arques (FR);
Xavier Ibled, Arques (FR)

(73) Assignee: ARC FRANCE, Arques (FR)

( * ) Notice: Subject to any disclaimer, the term of this patent is extended or adjusted under 35 U.S.C. 154(b) by 375 days.

(21) Appl. No.: 16/615,825

(22) PCT Filed: May 22, 2018

(86) PCT No.: PCT/FR2018/051217
§ 371 (c)(1),
(2) Date: Nov. 22, 2019

(87) PCT Pub. No.: WO2018/215721
PCT Pub. Date: Nov. 29, 2018

(65) Prior Publication Data
US 2020/0140313 A1    May 7, 2020

(30) Foreign Application Priority Data
May 23, 2017 (FR) ..................................... 1754579

(51) Int. Cl.
*C03B 5/235* (2006.01)
*C03B 5/04* (2006.01)
(Continued)

(52) U.S. Cl.
CPC ............ *C03B 5/2353* (2013.01); *C03B 3/023* (2013.01); *C03B 5/04* (2013.01); *F27B 9/10* (2013.01)

(58) Field of Classification Search
CPC .................................................. C03B 5/2353
See application file for complete search history.

(56) References Cited

U.S. PATENT DOCUMENTS 3,880,639 A * 4/1975 Bodner .................... C03C 1/10
                                                        65/134.6
4,052,149 A    10/1977 Stiling
(Continued)

FOREIGN PATENT DOCUMENTS

| CA | 2673495 A1 | 6/2008 |
| CN | 1516680 A | 7/2004 |

(Continued)

OTHER PUBLICATIONS

English Translation of DE-19651691-A1 (Year: 1997).*
Database WPI Week 198309 Jan. 20, 1983 (Jan. 20, 1983) Thomson Scientific London. GB; AN 1983-20839K XP002777842.

*Primary Examiner* — Steven S Anderson, II
*Assistant Examiner* — Kurt J Wolford
(74) *Attorney, Agent, or Firm* — Volpe Koenig

(57) ABSTRACT

Installation including an industrial glass furnace (1) including a tank (2) for molten glass (3), a combustion heating chamber (4) situated above the tank (2), and a duct for evacuation of flue gases in communication with said heating chamber (4), and a stone furnace including a firing zone (21) for stone to be fired, the flue gas evacuation duct including a flue gas outlet that is connected to the firing zone (21) of stone to be fired and supplying the firing zone (21) of stone to be fired with flue gases at high temperature.

4 Claims, 3 Drawing Sheets

(51) Int. Cl.
*F27B 9/10* (2006.01)
*C03B 3/02* (2006.01)

(56) References Cited

U.S. PATENT DOCUMENTS

| | | | |
|---|---|---|---|
| 4,316,732 A * | 2/1982 | Propster | C03B 3/023 65/27 |
| 4,405,350 A * | 9/1983 | Propster | C03B 3/023 65/27 |
| 4,479,778 A | 10/1984 | Blanchet et al. | |
| 4,752,314 A | 6/1988 | Fassbender et al. | |
| 4,875,919 A * | 10/1989 | DeSaro | C03B 3/023 65/27 |
| 5,057,133 A | 10/1991 | Chen et al. | |
| 5,290,334 A * | 3/1994 | Alexander | C03B 3/023 65/335 |
| 6,125,658 A | 10/2000 | Maugendre et al. | |
| 8,904,823 B2 | 12/2014 | Behen et al. | |
| 9,051,199 B2 | 6/2015 | Dewet-Smith et al. | |
| 10,301,219 B2 | 5/2019 | Piringer | |
| 2010/0175427 A1 | 7/2010 | Sorg | |

FOREIGN PATENT DOCUMENTS

| | | | | |
|---|---|---|---|---|
| CN | 1558874 A | 12/2004 | | |
| CN | 101993084 A | 3/2011 | | |
| CN | 102424392 A | 4/2012 | | |
| CN | 103492326 A | 1/2014 | | |
| CN | 106517738 A | 3/2017 | | |
| CN | 106565096 A | 4/2017 | | |
| DE | 19651691 A1 * | 8/1997 | ............ | C03B 3/023 |
| EP | 0132654 A1 | 2/1985 | | |
| EP | 0808806 A1 * | 11/1997 | ............ | F23L 7/007 |
| JP | S52146411 A | 12/1977 | | |
| JP | S58 9829 A | 1/1983 | | |
| JP | S6424021 A | 1/1989 | | |
| JP | H08208239 A * | 8/1996 | ............ | C03B 3/023 |
| RU | 2303759 C1 | 7/2007 | | |
| RU | 2422386 C1 | 6/2011 | | |
| RU | 2425312 C2 | 7/2011 | | |
| RU | 2515928 C2 | 5/2014 | | |
| SU | 476427 A1 | 7/1975 | | |
| SU | 649936 A1 | 2/1979 | | |
| SU | 748103 A1 | 7/1980 | | |
| SU | 948928 A1 | 8/1982 | | |
| WO | 9905068 A1 | 2/1999 | | |
| WO | WO-9915466 A2 * | 4/1999 | ............ | B01D 46/30 |
| WO | 9959926 A1 | 11/1999 | | |
| WO | 2002092521 A1 | 11/2002 | | |
| WO | 2003057636 A1 | 7/2003 | | |
| WO | 2008064790 A1 | 6/2008 | | |
| WO | 2015018504 A1 | 2/2015 | | |

* cited by examiner

COMBINED FURNACE

FIELD OF THE INVENTION

The invention concerns the field of the glass making industry. Melting the materials constituting the glass necessitates input of a large quantity of energy. The temperature of the glass bath is of the order of 1300 to 1500° C. Depending on its composition, the glass is intended for direct domestic use, for example in bottles, drinking glasses, windows, or indirect domestic use, for example vitroceramic sheets, or industrial use.

BACKGROUND

The furnace is subjected to very high thermal and mechanical stresses. The furnace is constructed with refractory linings of high quality. These refractory linings are costly and sensitive to certain constituents of the glass that are liable to react chemically. The refractory linings being poor conductors of heat, the glass bath is heated from above.

One or more liquid or gas fuel flame burners is or are disposed between the glass bath and the top of the furnace, also referred to as the vault. The glass bath is essentially heated by radiation. The gas outlet temperature is from 1300 to 1600° C. depending on the glass family.

Moreover, the manufacture of glass gives off large quantities of gas. The glass bath is degassed for several hours to prevent the formation of bubbles in the glass. To facilitate the degassing fining additives such as sulfates may be used. The furnace produces batches of glass of chosen composition.

The flue gases, from degassing and from combustion, are evacuated via a chimney.

Attempts have been made to recover the energy contained in the flue gases from a glass furnace. The fuel, either fuel oil or methane, can be preheated by the flue gas but only at temperatures below 550° C. Above that temperature decomposition into hydrogen and carbon occurs. Hydrogen is difficult to manipulate safely. Carbon is deposited on the walls of the pipes in the form of tars. The energy gain is slow, less than 50% of the latent heat of the flue gases.

Another proposal is to cause the flue gases to enter a first heat recovery device for storing thermal energy and oxidizing air to enter a second heat recovery device that has stored the thermal energy of the flue gases. Alternation is controlled by a set of valves. This system necessitating high investments offers a good efficiency of approximately 65%. The temperature of the gases at the outlet of the recovery device is of the order of 400° C.

The Applicant has pursued the objective of a major reduction in energy consumption relative to the mass of glass produced.

SUMMARY

The Applicant proposes a combined glass and stone furnace. By «stone furnace» is meant a furnace for curing stone, such as limestone, dolomite, flint, hydrated alumina, susceptible to provide after firing a raw material, in particular one forming part of the composition of the glass.

In a sodiocalcic glass the main initial materials are limestone, soda for example in the form of sodium carbonate $Na_2CO_3$ and silica in the form of quartz-sand. Limestone and sodium carbonate release $CO_2$ during the production of the glass.

The economic balance linked to the use of pre produced raw materials (quicklime, magnesium lime, etc.) is less favorable than that of conventional raw materials despite a reduced transported and manipulated tonnage.

The Applicant proposes an installation including an industrial glass furnace including a molten glass tank, a combustion heating chamber arranged above the tank, and a duct for evacuation of flue gases in communication with the heating chamber; and a stone furnace including a firing zone for stone to be fired, the flue gas evacuation duct including a flue gas outlet that is connected to the firing zone of stone to be fired supplying the firing zone of stone to be fired with flue gases at high temperature.

The stone furnace functions in cross flow mode. The stone to be fired is loaded into the top of the stone furnace and descends as it is transformed by the effect of the heat. Lime, magnesia, fragmented silica, dehydrated alumina, etc. is recovered at the bottom of the stone furnace. The hot gases are introduced into the stone furnace. The thermal energy of the hot gases is transferred to the stone being fired. The gas outlet temperature may be low. Excellent energy recovery is affected by recovery of the unavoidable energy.

At the temperatures encountered in the stone furnace:

the limestone is converted into lime through calcination, with release of $CO_2$.

The dolomite is converted into a combination of magnesium oxide and calcium oxide through calcination with release of $CO_2$.

Flint generally comprises approximately 90% silica and approximately 10% of compounds of Mg, Ca, Al and/or Na. These species are involved in the production of the glass. Flint heated to a high temperature becomes friable and is fragmented. In contrast, non fired flint has a high hardness making it difficult to grind. Now a millimeter particle size range is required for faster melting. River flint, sea flint or quarry flint may be used for firing.

Hydrated alumina is dehydrated at high temperature.

Moreover, some of the flue gases may be sent to the stone furnace and the remainder to a tandem alternative recovery device. The production of lime may be adapted to suit demand.

Another unexpected advantage has become apparent. In the present installation, the chlorine present in the flue gases may be deposited on the surface of the stones to be fired and recycled into the glass furnace. Chlorine may be present in association with lime in the form of calcium chloride and magnesia in the form of magnesium chloride. Chlorine is a fining agent that favors degassing of the molten glass.

Sulfur is a better fining agent than chlorine. Sulfur present in the flue gases may be deposited on the surface of the stones to be fired and be recycled into the glass furnace. Sulfur may be present in the form of calcium sulfate, magnesium sulfate or sodium sulfate. Recycling the sulfur in sulfates associated with the fired stone enables an approximately 50% reduction in the supply of sulfate, in particular calcium sulfate, to the glass furnace. Moreover, treatment of the flue gases before they are released into the atmosphere is made simpler, or even unnecessary.

The installation enables recycling thanks to its properties of (i) self-neutralization of the acid species present in the flue gases and (ii) self-cleaning limiting maintenance operations on the flue gas ducts.

Said stone furnace or a supplementary stone furnace may equally serve for the production of magnesium and calcium oxides. That mixture is then produced by calcination of dolomite. Using said mixture of magnesium and calcium oxides enables reduction of shrinkage, namely the release of $CO_2$ in particular In one embodiment, said flue gases outlet is formed in a flue of the flue gases evacuation duct. The flow rate of flue gases in said flue gases outlet may be controlled.

In one embodiment the fuel is gas and/or fuel oil.

In one embodiment the oxidizer is air.

In one embodiment the oxidizer is oxygen. The amount of NOx in the flue gases is reduced and the energy consumption is reduced.

In one embodiment the capacity of the glass furnace is greater than 10 tons of glass per day. The furnace is of industrial type.

In one embodiment the installation includes at least two glass furnaces and one stone furnace. The shutting down of the glass furnaces may be staggered to ensure continuity of heating of the stone furnace. The installation may also include a device for recovering energy from the flue gases in the case of using air as the oxidizer.

In one embodiment the installation includes a glass furnace, a stone furnace and a top up burner adapted to heat the stone furnace. Sustained and constant production by the stone furnace is obtained.

In one embodiment the firing zone is tubular, a zone for supplying stone to be fired being disposed above and a zone for extracting fired stone being disposed below. In a conventional furnace the fired stone is cooled by the oxidizer air introduced from below. Here a small pressure reduction in the fired stone extraction zone prevents downward escape of flue gases. An upward air flow is therefore produced. If the flue gases are at too high a temperature, for example for the lining of the stone furnace, a greater pressure reduction is used, whence dilution of the flue gases in the firing zone and a lowering of temperature.

In the contrary situation where it is wished to preserve a high temperature in the firing zone, air that has entered via the fired stone extraction zone and found in the bottom of the firing zone is diverted. The diversion may be directed toward the air inlet of the glass furnace. The diversion may be toward an inlet of a regenerator enabling cooling to be limited when operating to supply the glass furnace. The diversion may be directed toward a zone of the stone furnace situated above the firing zone.

The invention proposes a method of firing stone to be fired:

stone to be fired is introduced into a firing zone of stone to be fired, and the firing zone is fed with combustion flue gases coming from a flue gases evacuation duct downstream of a combustion heating chamber of an industrial glass furnace including a molten glass tank and said flue gases evacuation duct in communication with the heating chamber during heating of the glass furnace.

In one embodiment, the stone to be fired is chosen from limestone, dolomite, flint and hydrated alumina. Firing of limestone and dolomite is calcination, that is to say release of $CO_2$ or decarbonatation. The firing of the flint is thermal fragmentation. The firing of hydrated alumina is desiccation through elimination of bound water.

During the rise in temperature of the stone to be fired, free water and then bound water are eliminated, followed by decomposition of the carbonates into oxides and $CO_2$. In a lime furnace employing combustion of natural gas, the fuel is introduced into one or more combustion zones of the lime furnace and the oxidizer air is partly introduced via the bottom of the lime extraction zone and/or in the combustion zone or zones.

Here the stone furnace is of the hot gas type. The hot gases are introduced into a zone situated at approximately ⅔ the height of the stone furnace.

A stone furnace may be provided with a height between 20 and 30 m and an inside diameter of 3 to 5 m, with a firing zone 3 to 4 m high.

In one embodiment the maximum temperature in the firing zone of stone to be fired is greater than 900° C., preferably greater than 1000° C. Decarbonatation occurs rapidly.

In one embodiment firing the stone to be fired lowers the temperature of the flue gases to below 300° C., preferably below 200° C. The flue gases exit at 100° C. or a slightly higher temperature via the throat of the stone furnace. The energy losses are very low and condensation of water vapor from the flue gases and resulting from desiccation of the stone to be fired is avoided.

In one embodiment, the temperature of the flue gases is lowered more than 900° C., preferably more than 1100° C., more preferably more than 1200° C. The flue gases are able to enter the stone furnace at more than 1300° C., for example approximately 1500° C. The power recovered in a furnace may be between 10 and 30 kW per ton of daily glass production.

In one embodiment the stone to be fired remains in the firing zone of stone to be fired for between 1 and 4 h inclusive and in the stone furnace for 12 to 36 h.

In one embodiment the stone to be fired is moved in contraflow with the oxidizer gases.

In one embodiment the flue gases include chlorinated components and said chlorinated components are trapped on the stone to be fired in the case of use of dolomite and limestone. A mixture of magnesium and calcium oxides or lime with a chlorides content compatible with its use in glassmaking is obtained at the outlet.

In one embodiment the flue gases include sulfurated components and said sulfurated components are trapped on the stone to be fired, in particular when using dolomite and limestone. A stone made up in particular of oxides of magnesium and calcium or lime is obtained at the outlet of the stone furnace with a content of sulfates compatible with its use for glassmaking.

The stone furnace is therefore self-neutralizing and self-cleaning for flue gases the S and Cl content of which under normal conditions demands specific processing. A flue gases neutralization treatment is of no utility.

In one embodiment the glass obtained in the industrial glass furnace is sodiocalcic, borosilicate or aluminosilicate glass, quartz or vitroceramic.

BRIEF DESCRIPTION OF THE DRAWINGS

Other features, details and advantages of the invention will become apparent on reading the following detailed description and from the appended drawings, in which.

DETAILED DESCRIPTION OF THE PREFERRED EMBODIMENTS

The following description and drawings essentially contain elements of a certain character. They may therefore not only serve to explain the present invention better but also contribute to its definition if necessary.

The Applicant has carried out trial calcination of limestone in the duct of an operating industrial glass furnace. The mass of the samples of limestone was from 396 to 633 grams. The temperature at the start of calcination was between 1240 and 1340° C. inclusive. The temperature at the end of calcination was between 1290 and 1380° C. inclusive. The calcination reaction $CaCO_3 \rightarrow CaO+CO_2$ leads to a theoretical loss of mass of 43%. Calcination times less than 1 hour produce losses of mass that are too low, indicative of incomplete calcination. One hour of calcination produces a loss of mass of 42.1%. 1.75 to 2.25 hours of calcination produces a loss of mass 43.7 to 44% reflecting complete calcination and a slight loss of material on recovering the sample. The loss is linked to the test conditions and may be prevented in an industrial process. The flue gases leaving the glass furnace enable calcination of the limestone. The other stones to be fired may include dolomite, flint, hydrated alumina.

Figure 1:
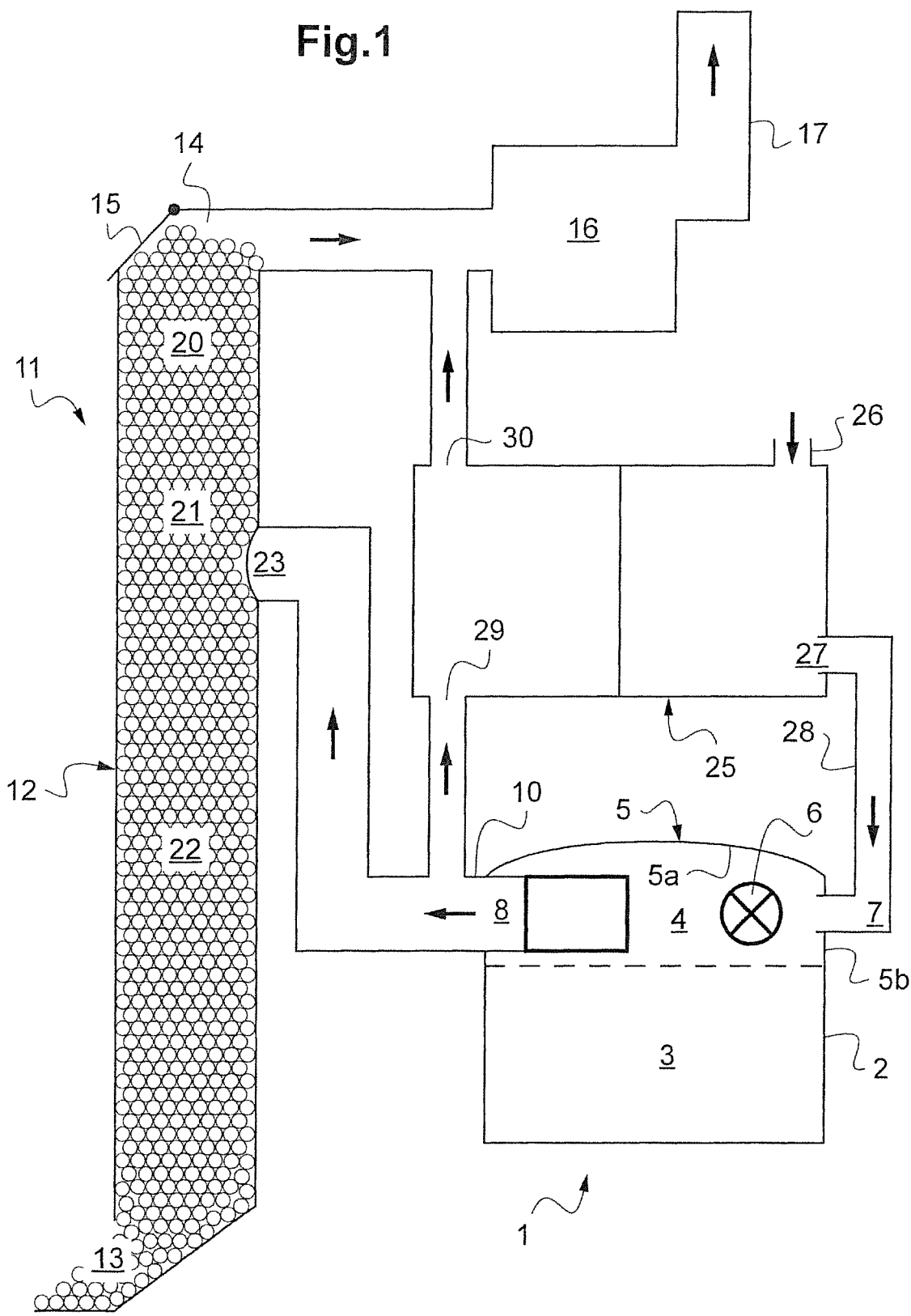
FIG. 1 is a sectional view of a combined installation according to one aspect of the invention.

The glass furnace 1 includes a tank 2 containing molten glass 3 for batch production. The glass furnace 1 includes a combustion chamber 4 situated above the bath of molten glass 3 and an upper wall 5 made up of a vault 5a and vertical parts 5b termed side walls (length) or gables (width) delimiting the combustion chamber 4. The glass furnace 1 includes at least one burner 6 fed with fuel oil or gas and an oxidizer inlet 7. The oxidizer may be air, see FIG. 1, or oxygen, see FIG. 2.

The tank 2 and the upper wall 5 are made of refractory materials reinforced by an external metal structure away from zones of high temperature. The burner 6 produces a flame oriented horizontally in the combustion chamber 4. The glass furnace 1 includes a flue gases outlet 8 in one of the vertical walls 5b above the bath of molten glass. The burner 6 and the flue gases outlet 8 may be on the same shorter side so that the flame and the flue gases follow a U shaped path in the combustion chamber 4. The glass furnace 1 may be a loop furnace.

Downstream of the glass furnace 1 in the direction of movement of the flue gases the installation includes a duct 10. The duct 10 is a substantially horizontal flue gases duct. The duct 10 is in fluid communication with the combustion chamber 4 via the flue gases outlet 8. The duct 10 is made of refractory materials reinforced by an external metal structure away from the zones of high temperature. The duct 10 is provided with a fork and has two outlets. The duct 10 does not include valves.

Downstream of the glass furnace 1 in the direction of movement of the flue gases the installation includes a stone furnace 11. The stone furnace 11 may be a lime furnace. The stone furnace 11 has a vertically oriented structure. The stone furnace 11 is circular. The stone furnace 11 is made of refractory materials reinforced by an external metal structure away from the zones of high temperature. The stone furnace 11 may have a height of 25 m and a diameter of 4 m for example. The stone furnace 11 includes a chamber 12 with a vertical axis, a bottom opening 13 and a top opening 14 or throat. The bottom opening 13 enables extraction of the fired stone and introduction of sufficient air to prevent flue gases exiting via said bottom opening 13.

The top opening 14 enables the introduction of the stone to be fired, for example via a hatch 15, and the flue gases to exit. The top opening 14 may be fitted with a separator for on the one hand treating the flue gases, in particular extraction of dust in a filter 16, and on the other hand feeding the stone furnace 11 with stone to be fired. Downstream of the filter 16 a chimney 17 is adapted to evacuate the cooled flue gases from which the dust has been removed. Downstream of the filter 16 the flue gases can be released into the atmosphere whereas the filter receives directly the flue gases coming from the stone furnace 11 or from an energy recovery device.

The structure of the chamber 12 is generally airtight. The chamber 12 includes a preheating zone 20 adjacent to the top opening 14, a firing zone 21 situated under the preheating zone 20, and a cooling zone 22 situated under the firing zone 21 and adjacent to the bottom opening 13. Between the firing zone 21 and the cooling zone 22 the chamber includes an opening 23 in fluid communication with one of the outlets of the duct 10. The cooling zone 22 has a height of 55 to 75% of the height of the chamber 12. The firing zone 21 has a height of 5 to 20% of the height of the chamber 12. The preheating zone 20 has a height of 10 to 25% of the height of the chamber 12.

The installation also includes a heat exchanger 25 in fluid communication with the other outlet of the duct 10. The heat exchanger 25 transfers thermal energy from the flue gases to the air feeding the glass furnace 1. The transfer may be via heat conducting plates in the case of a recovery device. The transfer may be via intermediate thermo storage in materials of high calorific capacity in the case of a regenerator device. The flows of flue gases and oxidizer air alternate, one heating and the other cooling the regenerator device, by means of mobile flaps.

The heat exchanger 25 has an ambient air inlet 26 and a hot air outlet 27. The hot air outlet 27 is connected by a duct 28 to the oxidizer inlet 7. The heat exchanger 25 has a hot flue gases inlet 29 fed by the other outlet of the duct 10 and a cooled flue gases outlet 30 leading to the filter 16.

Figure 2:
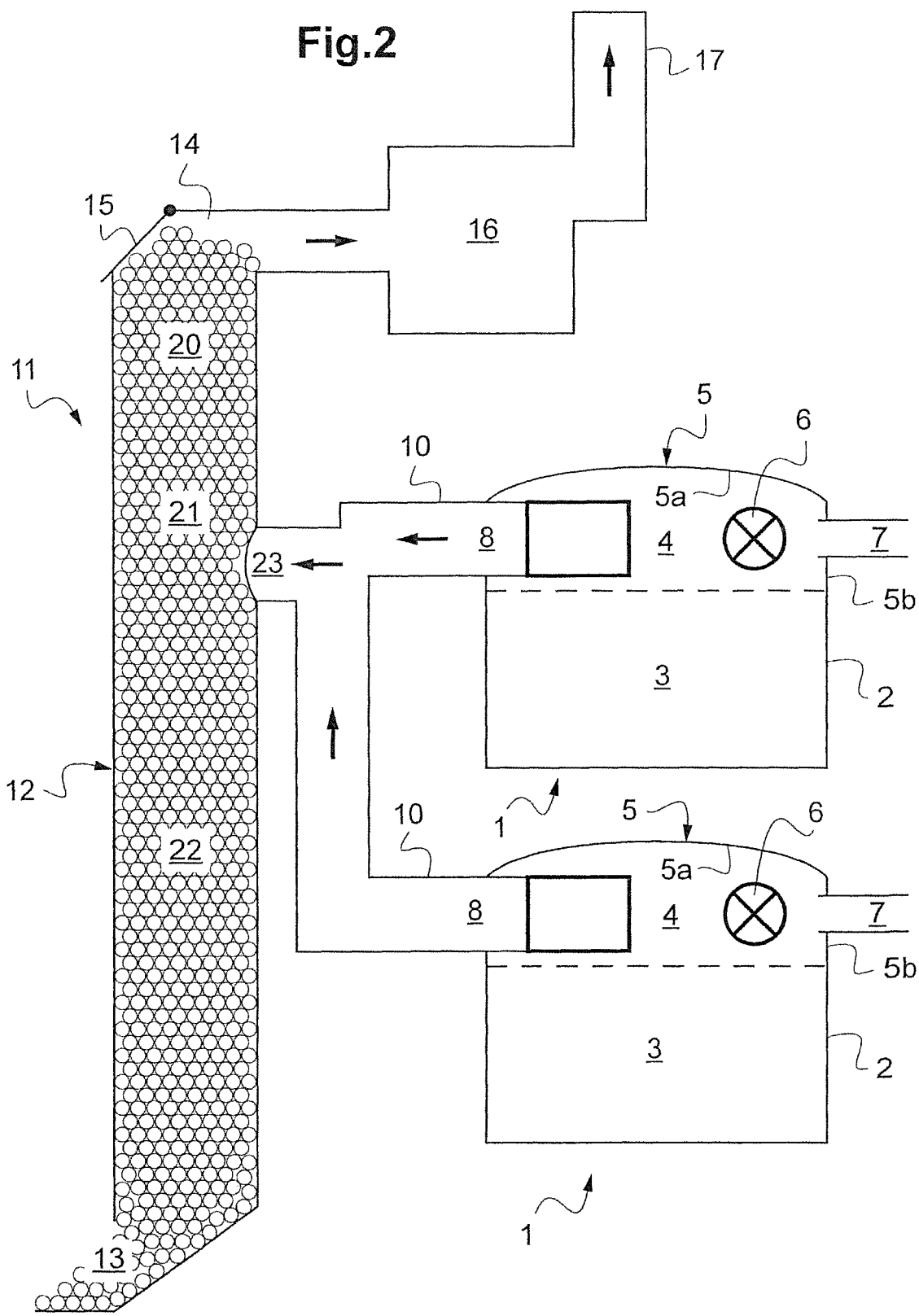
FIG. 2 is a sectional view of a combined installation according to another aspect of the invention.

In the embodiment shown in FIG. 2 the glass furnace is an oxygas furnace, that is to say it uses a fuel gas, generally methane, and oxygen as the oxidizer. The inlet and outlet gas flow rates are then reduced, in particular by 80%, at the oxidizer inlet because of the absence of nitrogen in the air. Because of this, the NOx content can be divided by 3. The flue gases are made up essentially of water vapor coming from the combustion of the gas and carbon dioxide from the combustion of the gas and the degassing of the glass, together with other degassing gases. The flue gases flow rate being lower than in the previous embodiments, at least two glass furnaces 1 and one stone furnace 11 may be coupled up.

Figure 3:
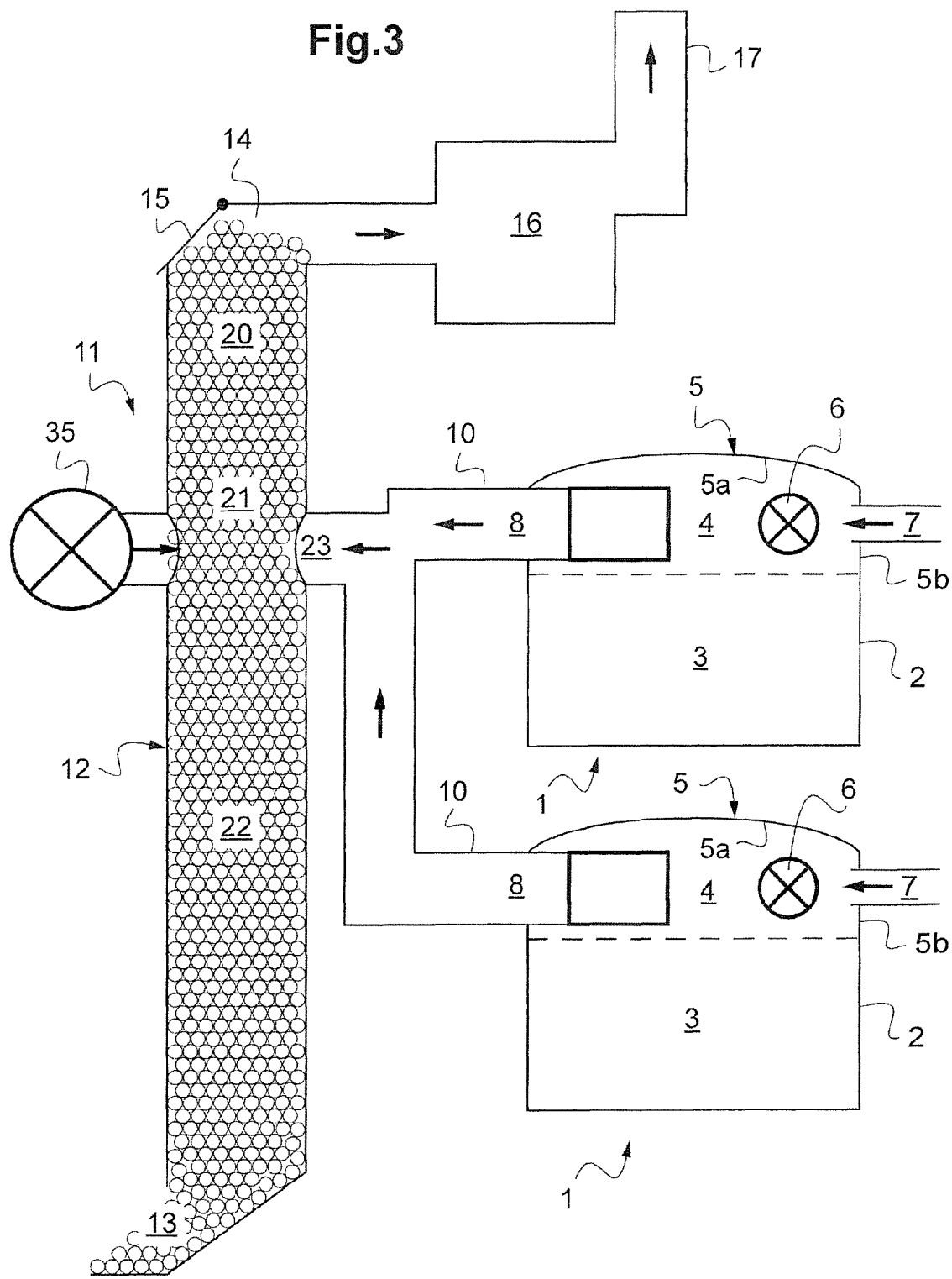
FIG. 3 shows a variant of FIG. 2.

In the embodiment shown in FIG. 3 a top up burner 35 is provided in the stone furnace 11 and consumes air rising in the cooling zone 22 or alongside the stone furnace 11 supplying a supplementary flow rate of flue gases at high temperature.

In the above embodiments the flue gases exit the stone furnace at low temperature, having lost a large part of the chlorides and sulfates that said flue gas contains on leaving the glass furnace. The flue gases are therefore neutralized and cleaned to the point where neutralization of the flue gases further downstream becomes of no utility. Neutralization produces $CaCl_2$ and $CaSO_4$ in the case of lime, $MgCl_2$ and $MgSO_4$ in the case of dolomite, remaining in the fired stone. These compounds add chlorides and sulfides to the bath of glass.

The invention is of greater interest if the glass furnace produces a grade of glass necessitating a high temperature, in particular borosilicate glass, for example Pyrex®, or vitroceramic.

In other words, the stone to be fired includes at least one of the following: limestone, dolomite, flint or hydrated alumina. The stone to be fired is introduced into the stone furnace from the top and begins a descent leading it after firing to exit via the bottom of the stone furnace, having passed through the chamber thereof. The chamber includes a preheating zone, a firing zone and a cooling zone in that order in the direction in which the stone descends.

The gases pass upwards through the chamber. Said gases may include ambient air entering at the bottom and leaving either at the top of the stone furnace or at the top of the cooling zone. Said gases include combustion flue gases. The combustion flue gases enter at the bottom of the firing zone of stone to be fired. The combustion flue gases travel through the firing zone and the preheating zone. The combustion flue gases come from a flue gases evacuation duct downstream of a combustion heating chamber of an industrial glass furnace. The industrial glass furnace includes a molten glass tank and said flue gases evacuation duct at the outlet of the heating chamber during heating of the glass furnace. The combustion flue gases are at a temperature between 1300 and 1500° C. inclusive at the outlet of the heating chamber. The flue gases at the outlet of the stone furnace are at a temperature between 100 and 200° C. inclusive, preferably between 100 and 150° C. inclusive.

The invention is not limited to the examples of processes and containers described hereinabove by way of example only and encompasses all variants that the person skilled in the art might envisage that are within the scope of the following claims.

The invention claimed is:

1. An installation including an industrial glass furnace (1) comprising a tank (2) for molten glass (3), a combustion heating chamber (4) situated above the tank (2), and a duct for evacuation of flue gases in communication with said heating chamber (4), and a stone furnace (11) comprising a firing zone (21) for stone to be fired, and a cooling zone (22) situated under the firing zone (21), wherein ambient air enters at a bottom portion of the stone furnace (11), passing upwardly through the cooling zone (22), the duct comprising a flue gas outlet that is connected to the firing zone (21) of stone to be fired and supplying the firing zone (21) of stone to be fired with flue gases at a temperature greater than 900° C.

2. The installation as claimed in claim 1, wherein the flue gases outlet is in a duct (10) of the flue gases evacuation duct.

3. The installation as claimed in claim 1 wherein the fuel is gas and/or fuel oil, the oxidizer is oxygen and/or air and the daily capacity of the glass furnace is greater than 10 tons of glass per day.

4. The installation as claimed in claim 1, wherein the firing zone (21) is tubular, a stone to be fired feeding zone being disposed above and a fired stone extraction zone being disposed below.

* * * * *